US012570168B2

(12) United States Patent
Kumar et al.

(10) Patent No.: US 12,570,168 B2
(45) Date of Patent: Mar. 10, 2026

(54) VEHICLE POWER SUPPLY SYSTEM

(71) Applicant: Transportation IP Holdings, LLC,
Norwalk, CT (US)

(72) Inventors: Ajith Kuttannair Kumar, Erie, PA
(US); Bret Worden, Erie, PA (US);
Jeremy Thomas McGarry, Erie, PA
(US)

(73) Assignee: Transportation IP Holdings, LLC,
Norwalk, CT (US)

( * ) Notice: Subject to any disclaimer, the term of this
patent is extended or adjusted under 35
U.S.C. 154(b) by 1039 days.

(21) Appl. No.: 17/653,738

(22) Filed: Mar. 7, 2022

(65) Prior Publication Data

US 2023/0278438 A1 Sep. 7, 2023

(51) Int. Cl.
| | |
|---|---|
| *B60L 53/16* | (2019.01) |
| *B60L 53/31* | (2019.01) |
| *B60L 53/66* | (2019.01) |
| *B60M 1/12* | (2006.01) |

(52) U.S. Cl.
CPC .............. *B60L 53/16* (2019.02); *B60L 53/31*
(2019.02); *B60L 53/66* (2019.02); *B60M 1/12*
(2013.01); *B60L 2200/18* (2013.01)

(58) Field of Classification Search
CPC .......... B60L 53/16; B60L 53/31; B60L 53/66;
B60L 2200/18; B60L 53/14; B60L 5/36;
B60L 53/32; B60L 53/35; B60L 5/18;
B60M 1/12; Y02T 10/70; Y02T 10/7072;
Y02T 90/14
See application file for complete search history.

(56) References Cited

U.S. PATENT DOCUMENTS

| | | | | |
|---|---|---|---|---|
| 3,547,237 A | * | 12/1970 | Ives | B60L 50/53 |
| | | | | 191/4 |
| 3,924,084 A | * | 12/1975 | Lindfors | B60L 5/10 |
| | | | | 191/82 |
| 9,550,428 B1 | * | 1/2017 | Ertel | B60L 53/37 |

(Continued)

FOREIGN PATENT DOCUMENTS

| | | |
|---|---|---|
| CN | 111231687 A | 6/2020 |
| CN | 113829936 A | 12/2021 |

OTHER PUBLICATIONS

Extended European Search Report for related EP App. No. 23150925.8
dated Jul. 17, 2023 (10 pages).

*Primary Examiner* — Nha T Nguyen
(74) *Attorney, Agent, or Firm* — K&L Gates LLP

(57) ABSTRACT

A vehicle power supply system includes a control contactor
and at least first and second power contactors along a top
side of a vehicle. The first and second power contactors
receive different polarities of electrical power from an
off-board power supply system to power the vehicle. The
control contactor conducts a control signal indicative of
whether the first and second power contactors are conduc-
tively coupled with the off-board power supply system. The
first power contactor receives a positive polarity of the
electrical power and the second power contactor receives a
negative polarity of the electrical power while the vehicle
has a first orientation relative to the off-board power supply
system. The first power contactor receives the negative
polarity and the second power contactor receives the posi-
tive polarity while the vehicle has an opposite, second
orientation relative to the off-board power supply system.

10 Claims, 5 Drawing Sheets

(56) References Cited

U.S. PATENT DOCUMENTS

| | | | |
|---|---|---|---|
| 9,988,835 B2* | 6/2018 | Storm | B60L 53/16 |
| 12,354,793 B2* | 7/2025 | Morgan | H01F 7/0247 |
| 2009/0011616 A1* | 1/2009 | Patwardhan | B60L 5/00 |
| | | | 439/34 |
| 2010/0039067 A1* | 2/2010 | Hill | B60L 5/42 |
| | | | 320/109 |
| 2013/0193918 A1* | 8/2013 | Sarkar | B60L 53/305 |
| | | | 320/109 |
| 2016/0130851 A1* | 5/2016 | Storm | B60L 50/53 |
| | | | 49/31 |
| 2016/0167524 A1* | 6/2016 | Bedell | B60L 5/42 |
| | | | 191/22 R |
| 2016/0280085 A1* | 9/2016 | Shah | B60L 53/36 |
| 2016/0332525 A1* | 11/2016 | Kufner | B60L 53/36 |
| 2017/0080813 A1* | 3/2017 | Bedell | B60L 5/18 |
| 2017/0124783 A1* | 5/2017 | Alm | B60L 3/0023 |
| 2017/0158074 A1* | 6/2017 | Buehs | B60L 53/30 |
| 2017/0190256 A1* | 7/2017 | McGrath | B60L 5/18 |
| 2017/0210237 A1* | 7/2017 | Buehs | H01M 10/44 |
| 2017/0297551 A1* | 10/2017 | Björkman | B60W 10/08 |
| 2018/0251033 A1* | 9/2018 | Tsutsumi | B60L 5/16 |
| 2021/0237601 A1* | 8/2021 | Kim | B60L 53/32 |
| 2022/0144116 A1* | 5/2022 | Chun | H02J 7/0042 |
| 2023/0001807 A1* | 1/2023 | Li | B66F 7/08 |
| 2023/0098461 A1* | 3/2023 | Xu | B60L 53/11 |
| | | | 320/109 |
| 2024/0326601 A1* | 10/2024 | Flois | B60L 53/35 |
| 2025/0026233 A1* | 1/2025 | Lee | B60L 53/10 |
| 2025/0178461 A1* | 6/2025 | Prasad | B60L 53/14 |

* cited by examiner

900

| | |
|---|---|
| Couple vehicle electrical contactors to vehicle | 902 |
| ↓ | |
| Electrically connect a control contactor of the vehicle electrical contactors to a controller | 904 |
| ↓ | |
| Electrically connect power contactors of the vehicle electrical contactors to power electronics | 906 |

VEHICLE POWER SUPPLY SYSTEM

BACKGROUND

Technical Field

The subject matter described herein relates to transferring electrical power between systems onboard vehicles and off-board systems, particularly for powering the vehicles.

Discussion of Art

Some vehicles are electrically powered and receive power from off-board power supply assemblies, such as pantographs, catenary wires, and electrified rails. These vehicles are equipped with electric current-collecting devices that conductively couple to corresponding conductors of the off-board power supply assembly to receive electrical power from the off-board power supply assembly.

A least some systems for supplying power to vehicles from off-board power supply assemblies are operable in only one orientation of the vehicle relative to the off-board assembly. For example, a known system includes an array of conductors onboard the vehicle that make contact with specific corresponding conductors of a pantograph device of the off-board power supply assembly when the vehicle is in a desired orientation relative to the pantograph device. The orientation of the vehicle refers to the direction that the vehicle is facing, which refers to the direction from a back end of the vehicle to a front end of the vehicle (e.g., a forward-facing direction). If the vehicle arrives at the pantograph device with a reverse orientation from the desired orientation, the array of conductors onboard the vehicle do not make contact with the specific corresponding conductors of the pantograph device. For example, a conductor of the vehicle configured to receive positive polarity electrical power may physically contact a conductor of the pantograph that is a control conductor for conducting control signals. As a result of conductor mis-match, no electrical power may transfer between the vehicle and the off-board power supply unless the vehicle is in the prescribed orientation.

At least some systems that include pantographs off-board the vehicle may have difficulty in aligning the vehicle relative to the pantograph to enable the corresponding conductors to couple for electrical power transfer. For example, the conductors on the vehicle and the pantograph are typically about two feet in length, which forces the vehicle operator to stop the vehicle very precisely to allow the corresponding conductors to align and couple for charging batteries onboard the vehicle. This task of stopping within a two foot tolerance range may be difficult for road vehicle operators, such as bus drivers, and may be relatively more difficult for rail vehicle operators, such as operators of light rail vehicles and locomotives. It may be desirable to have a system and method that differs from those that are currently available.

BRIEF DESCRIPTION

In one or more embodiments, a vehicle power supply system is provided that includes plural vehicle electrical contactors extending along a top side of a vehicle. The plural vehicle electrical contactors include a control contactor and at least first and second power contactors. The first and second power contactors may receive different polarities of electrical power from an off-board power supply system to power the vehicle. The control contactor may conduct a control signal indicative of whether the first and second power contactors are conductively coupled with the off-board power supply system. The first power contactor may receive a positive polarity of the polarities of the electrical power and the second power contactor may receive a negative polarity of the polarities of the electrical power while the vehicle has a first orientation relative to the off-board power supply system. The first power contactor may receive the negative polarity of the polarities of the electrical power and the second power contactor may receive the positive polarity of the polarities of the electrical power while the vehicle has a second orientation relative to the off-board power supply system. The second orientation is opposite the first orientation.

In one or more embodiments, a vehicle power supply system is provided that includes a first contactor set and a second contactor set. The first contactor set may be coupled with a top side of a vehicle. The first contactor set includes a first positive contactor, a first negative contactor, and a first control contactor. The second contactor set may be coupled with the top side of the vehicle, and includes a second positive contactor, a second negative contactor, and a second control contactor. While the vehicle has a first orientation relative to an off-board power supply system, the first positive contactor is positioned to conductively couple to a positive conductor of the off-board power supply system to receive a positive polarity of electrical power from the off-board power supply system to power the vehicle; the first negative contactor is positioned to conductively couple to a negative conductor of the off-board power supply system to receive a negative polarity of the electrical power to power the vehicle; and the first control contactor is positioned to conductively couple to a control conductor of the off-board power supply system. While the vehicle has a second orientation relative to the off-board power supply system, opposite to the first orientation, the second positive contactor is positioned to conductively couple to the positive conductor of the off-board power supply system to receive the positive polarity of the electrical power to power the vehicle; the second negative contactor is positioned to conductively couple to the negative conductor of the off-board power supply system to receive the negative polarity of the electrical power to power the vehicle; and the second control contactor is positioned to conductively couple to the control conductor of the off-board power supply system.

In one or more embodiments, a vehicle power supply system is provided that includes plural vehicle electrical contactors extending along a top side of a vehicle. The plural vehicle electrical contactors include a first pair of contactors, a second pair of contactors between the first pair of contactors, and a medial contactor between the second pair of contactors. While the vehicle has a first orientation relative to an off-board power supply system, one of a first contactor of the first pair, a first contactor of the second pair, or the medial contactor is positioned to conductively couple to a positive conductor of the off-board power supply system to receive a positive polarity of electrical power from the off-board power supply system to power the vehicle; another of the first contactor of the first pair, the first contactor of the second pair, or the medial contactor is positioned to conductively couple to a negative conductor of the off-board power supply system to receive a negative polarity of the electrical power from the off-board power supply system to power the vehicle; and the third of the first contactor of the first pair, the first contactor of the second pair, or the medial contactor is positioned to conductively couple to a control conductor of the off-board power supply system. While the vehicle has a second orientation relative to the off-board power supply system, which is opposite the first orientation, one of a second contactor of the first pair, a second contactor of the second pair, or the medial contactor is positioned to conductively couple to the positive conductor of the off-board power supply system to receive the positive polarity of the electrical power to power the vehicle; another of the second contactor of the first pair, the second contactor of the second pair, or the medial contactor is positioned to conductively couple to the negative conductor of the off-board power supply system to receive the negative polarity of the electrical power to power the vehicle; and the third of the second contactor of the first pair, the second contactor of the second pair, or the medial contactor is positioned to conductively couple to the control conductor of the off-board power supply system.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
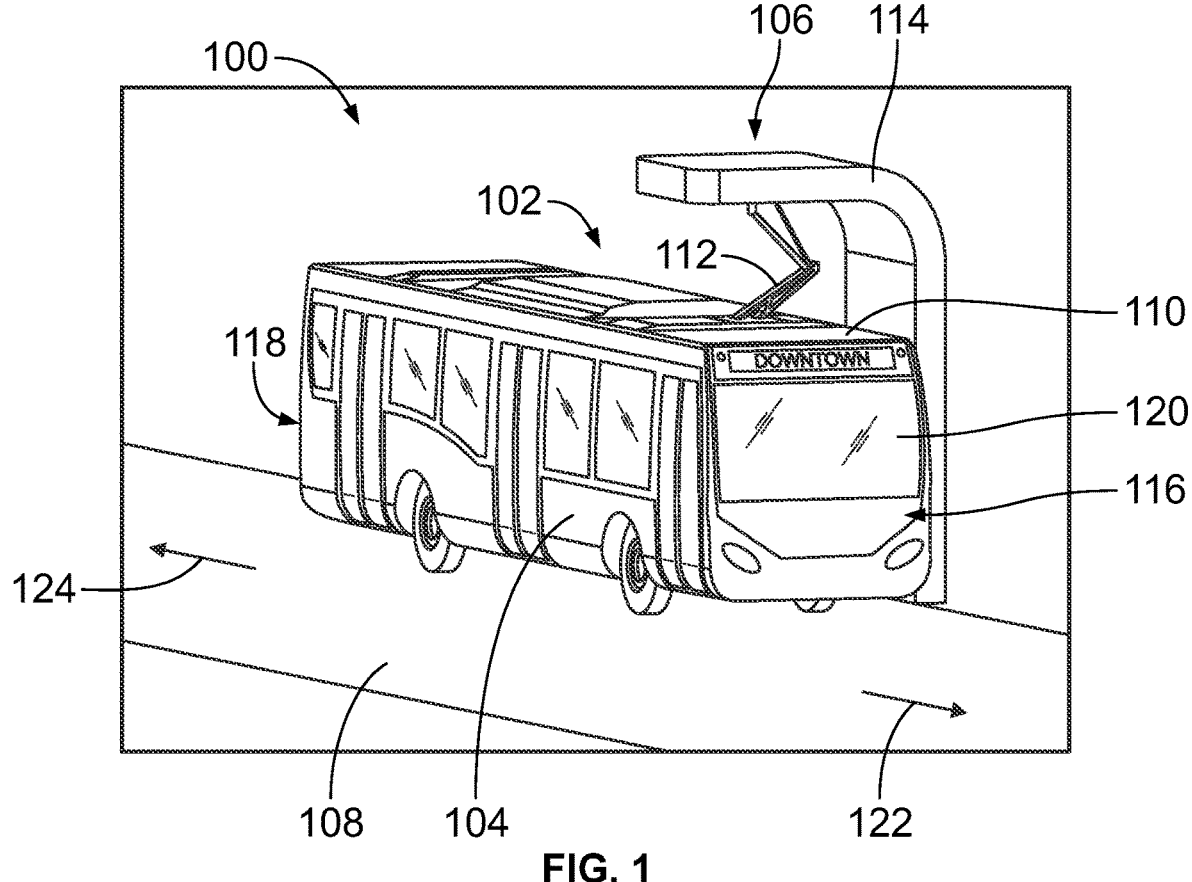
FIG. 1 is a perspective view of a power transfer system according to an embodiment according to an embodiment.

Embodiments of the subject matter described herein relate to a power transfer system that is designed to transfer electrical power between a vehicle and an off-board power supply. This may be done while the vehicle has either of at least a first orientation or a second orientation relative to the off-board power supply. The power transfer system may use off-board (stationary) pantographs to transfer electrical power to vehicles with high positional tolerance between the vehicle and the pantograph.

The power transfer system according to an embodiment has bidirectionality such that the vehicle can successfully receive electrical power from the off-board power supply when on an outbound leg of a trip, and can successfully receive electrical power from the same off-board power supply on a return leg of the trip while the vehicle is facing in the opposite direction relative to the outbound leg. In at least one embodiment, this bidirectionality is accomplished based on the design and arrangement of the components within the power transfer system, and without physically moving equipment on either of the vehicle or the off-board power supply. For example, contactors onboard the vehicle and corresponding conductors of the off-board power supply are specifically designed and arranged such that the contactors conductively couple to the conductors in a first coupling configuration while the vehicle has a first orientation relative to the off-board power supply, and the contactors conductively couple to the conductors in a different, second coupling configuration while the vehicle has a second orientation relative to the off-board power supply. The power transfer system is designed to enable power transfer between the vehicle and the off-board power supply in both the first and second configurations while maintaining safety by ensuring that the contactors are properly coupled to designated conductors before conveying the electrical power.

The electrical power received by the vehicle from the off-board power supply may be used to power the vehicle. For example, the electrical power may be conveyed to an onboard energy storage device. The energy storage device may include one or more batteries. In an embodiment, the vehicle may stop at the off-board power supply for a period of time to recharge the batteries. The energy storage device may be controlled to selectively supply electrical power to motors of a propulsion system for propelling the vehicle along a route. Alternatively, the electrical power may be conveyed directly to the motors of the propulsion system without first storing the electrical power in the energy storage device.

The power transfer system according the embodiments described herein provides a greater positional tolerance for the vehicle than known power transfer systems. For example, the vehicle may have a window of about 20 feet or more within which to stop relative to the off-board power supply to enable electrical power transfer. This positional tolerance enables application of the power transfer system to vehicles that struggle with precision stops, such as rail vehicles, and/or multi-vehicle systems where the operator is in a different vehicle than the vehicle which couples to the off-board power supply.

While one or more embodiments are described in connection with a rail vehicle system, not all embodiments are limited to rail vehicle systems. Unless expressly disclaimed or stated otherwise, the inventive subject matter described herein extends to other types of vehicles, such as buses, trucks (with or without trailers), automobiles, mining vehicles, agricultural vehicles, or other off-highway vehicles. The vehicles described herein (rail vehicles or other vehicles that do not travel on rails or tracks) can be part of a single vehicle system or a vehicle system of multiple vehicles. With respect to multi-vehicle systems, the vehicles can be mechanically coupled with each other (e.g., by couplers), or logically coupled but not mechanically coupled. For example, vehicles may be logically but not mechanically coupled when the discrete vehicles communicate with each other to coordinate movements of the vehicles with each other so that the vehicles travel together (e.g., as a convoy).

FIG. 1 is a perspective view of a power transfer system 100 according to an embodiment. The power transfer system includes a vehicle power supply system 102 disposed onboard a vehicle 104 and an off-board power supply system 106. The vehicle travels on a route 108. The vehicle in the illustrated example is a bus that travels on a road which represents the route. The off-board power supply system 106 is a stationary structure (e.g., monument) located along a side of the route. The vehicle moves relative to the off-board power supply system (also referred to herein as off-board system) as the vehicle travels along the route. In the illustrated embodiment, the vehicle stops at the off-board system to receive electrical power from the off-board system for powering the vehicle. For example, the electrical power received from the off-board system may be used to recharge one or more batteries of an onboard energy storage device. The off-board system includes a power source, such as access to an electrical grid or network, one or more batteries, or the like.

As described herein, the vehicle power supply system includes at least one set of electrically conductive elements, referred to herein as contactors. The contactors may extend along a top side 110 of the vehicle. The off-board system includes at least one set of electrically conductive elements, referred to herein as conductors. The conductors are held by at least one frame 112. The frame is mounted to a base structure 114 of the off-board system. When the vehicle stops within a designated stopping window relative to the off-board system, the contactors onboard the vehicle align with corresponding conductors of the off-board system. The contactors conductively couple to the corresponding conductors. The conductive coupling may occur via direct physical (e.g., mechanical) contact between the contactors and conductors. For example, the frame of the off-board system may be extendable and retractable relative to the base structure to bridge a clearance gap between the base structure and the contactors on the top side of the vehicle while the vehicle is located within the stopping window. In an embodiment, the frame and the conductors are components of a pantograph of the off-board system. Optionally, the vehicle power supply system may be designed to raise or lift the contactors towards the conductors of the off-board system in addition to, or instead of, the pantograph of the off-board system extending towards the vehicle.

The vehicle in FIG. 1 has a first orientation relative to the off-board system. The first orientation represents a direction that the vehicle is facing (e.g., a forward-facing direction). The vehicle has a front end 116 and a back end 118 opposite the front end. The operator sits near the front end and views the route through a windshield 120. An arrow parallel to a longitudinal axis of the vehicle and extending from the back end to the front end has a first forward-facing direction 122, which represents the first orientation of the vehicle. In an embodiment, the power transfer system is bidirectional, such that electrical power transfer can occur with the vehicle having the first orientation, as illustrated, as well as the vehicle having a second orientation that is opposite the first orientation. In the second orientation, the vehicle is facing in a second forward-facing direction 124 that is opposite the first forward-facing direction. The first and second orientations do not refer to direction of travel. It is noted that the vehicle can back up while having the first orientation, moving in the direction of the second forward-facing direction without having the second orientation. The bidirectionality enables the off-board system to power vehicles traveling along the route in different directions. This increased functionality may reduce the number of off-board systems needed to power vehicles along a segment of route, relative to unidirectional systems, and thereby reduce cost and reduce the footprint of the off-board systems along the route.

Figure 2:
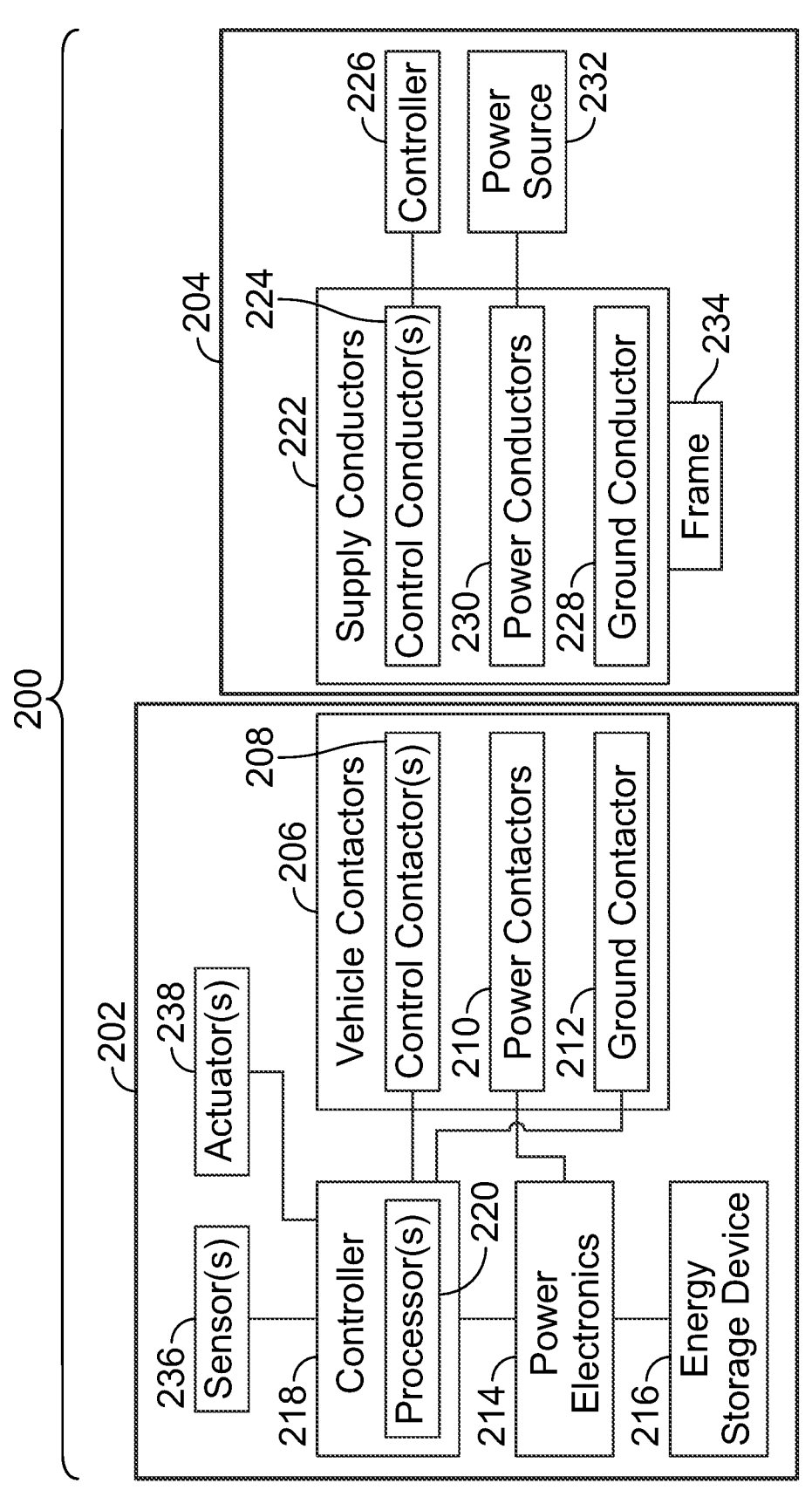
FIG. 2 is a schematic block diagram of a power transfer system for powering a vehicle according to an embodiment.

FIG. 2 is a schematic block diagram of a power transfer system 200 for powering a vehicle according to an embodiment. The power transfer system in FIG. 2 may represent the power transfer system shown in FIG. 1. The power transfer system includes a vehicle power supply system 202 and an off-board power supply system (e.g., off-board system) 204. One or both of the vehicle and off-board power supply systems may include more components and/or different components than the components illustrated in FIG. 2.

The vehicle power supply system includes vehicle electrical contactors 206. The vehicle electrical contactors are electrically conductive elements that convey control signals, electrical power, and/or provide a ground path. The vehicle electrical contactors (referred to herein as vehicle contactors and contactors) may be elongated, having the shape of rails. The contactors extend along a top side of the vehicle on which the vehicle power supply system is disposed.

The contactors may include one or more control contactors 208, plural power contactors 210, and a ground contactor 212. The power contactors receive different polarities of electrical power from the off-board system. For example, one or two power contactors receive positive polarity electrical power, and another one or two power contactors receive negative polarity electrical power, depending on the orientation of the vehicle. The ground contactor provides a conductive ground path between the vehicle power supply system and the off-board system. The control contactor(s) provides connection assurance to ensure, for safety purposes, that all of the contactors are properly connected prior to permitting power transfer between the vehicle power supply system and the off-board system. For example, the control contactor(s) conduct a control signal indicative of whether the power contactors are conductively coupled with corresponding conductors of the off-board system. The control signal may only be conducted when the power contactors, the control contactor(s), and the ground contactor is conductively coupled to respective corresponding conductors of the off-board system. In other embodiments, the vehicle may have a separate grounding circuit, which enables the vehicle contactors to omit a discrete ground contactor. For example, rail vehicles may be grounded via the connection between the wheels of the rail vehicles to the rails of the track.

The vehicle power supply system includes power electronics 214 conductively connected to the power contactors. The power electronics represent circuitry for conveying electrical power between the power contactors and an energy storage device 216 onboard the vehicle. For example, the power electronics may convey electrical power received from the off-board system, via the power contactors, to the energy storage device to charge the energy storage device. Optionally, the power electronics may bypass the energy storage device and convey the electrical power to one or more motors of the vehicle to power propulsion. The power electronics may include electrical devices for modifying the electrical power. The power electronics may step up or down the voltage of the electrical power, may change one or more of the polarities of the electrical power, may change the phase, and/or the like. In an example, the power electronics may switch a negative polarity of the electrical power to a positive polarity, and may switch a positive polarity of the electrical power to a negative polarity. The power electronics may include one or more rectifiers for modifying the electrical power. The energy storage device may include one or more batteries. The batteries may be lithium ion batteries, nickel-metal hydride, lead-acid, or the like. Optionally, the energy storage device may include one or more capacitors, such as ultracapacitors. The capacitors may be present with batteries or in lieu of batteries.

The vehicle power supply system may include a controller 218 that is operably connected to the other components of the vehicle power supply system via wired and/or wireless communication pathways. By "operably connected," it is meant that two or more devices, subsystems, assemblies, modules, components, and the like, are joined by one or more wired or wireless communication links, such as by one or more conductive (e.g., copper) wires, cables, or buses; wireless networks; fiber optic cables; or the like. The controller may be a control circuit. The controller represents hardware circuitry that includes and/or is connected with one or more processors 220 (e.g., one or more microprocessors, integrated circuits, microcontrollers, field programmable gate arrays, etc.). The controller includes and/or is connected with a tangible and non-transitory computer-readable storage medium (e.g., memory device). The memory device may store programmed instructions (e.g., software) that is executed by the one or more processors to perform the operations of the controller described herein.

The controller may be operably connected to the control contactor(s) and the ground contactor. For example, the controller may generate and/or receive control signals conveyed through the control contactor(s) to determine whether the vehicle contactors are properly connected to corresponding supply conductors 222 of the off-board system. When the control contactor(s) is electrically connected to one or more control conductor(s) 224 of the supply conductors, a closed circuit is established and the control signal is conducted along the closed circuit. The controller can detect that the circuit is closed by generating and then receiving the same control signal along a circuit loop that includes the control conductor(s), receiving a control signal generated by a controller 226 of the off-board system, and/or generating a control signal that is received by the controller of the off-board system. The controller 226 of the off-board system represents hardware circuitry that includes and/or is connected with one or more processors. The controller 226 of the off-board system may have similar hardware and components as the controller onboard the vehicle. The control circuit along which the control signal is conveyed may include the ground contactor and a corresponding ground conductor 228 of the off-board system, such that the circuit is only closed and conducting while both the control contactor(s) and the ground contactor are conductively coupled to each of the corresponding control and ground conductors of the off-board system.

In an embodiment, conduction of the control signal along the control circuit is indicative that the power contactors are properly connected to corresponding power conductors 230 of the off-board system. For example, the vehicle contactors may be positioned such that the power contactors on the vehicle conductively couple to the off-board power conductors before the control contactor(s) can conductively couple to the off-board control conductor(s), and coupling of the control contactor(s) to the control conductor(s) only occurs when the vehicle power contactors are coupled to the off-board power conductors. Furthermore, non-conduction of the control signal is indicative that not all of the required couplings between the conductive elements have been established, so the power transfer system is not ready to transfer power.

The controller onboard the vehicle and/or the controller of the off-board system permit the transfer of power after determining that the vehicle contactors are conductively coupled to the corresponding off-board conductors. For example, the controller onboard the vehicle may actuate a switching device of the power electronics (or otherwise in the circuit path between the power contactors and the energy storage device), to establish a close conducting pathway from the power contactors to the energy storage device. Optionally, the controller of the off-board system may actuate a switching device to enable the transfer of power from a power source 230 of the off-board power supply system to the vehicle power supply system via the power conductors and the power contactors. The power source may be a connection interface and electronics for receiving electrical power from an electrical grid or network. Alternatively, or in addition, the power source may include one or more batteries, capacitors, or the like. The supply conductors of the off-board system are held in place on a frame 234. The frame and the supply conductors may represent all or a portion of a pantograph. For example, the frame may be an extendable and retractable frame, similar to the frame of the pantograph shown in FIG. 1.

The vehicle power supply system optionally includes one or more sensors 236 and/or one or more actuators 238. The actuator(s) is mounted along the top side of the vehicle and mechanically attaches to at least some of the vehicle contactors. The actuator(s) may be operably connected to the controller onboard the vehicle. The controller may selectively control the actuator(s) to raise and lower the vehicle contactors that are attached to the actuator(s) for moving the vehicle contactors into and out of contact with the supply conductors of the off-board system. The actuator(s) may include an electrically-controlled motor attached to structural elements that connect to the vehicle contactors. In an embodiment, the controller controls the actuator(s) to move the power contactors from a retracted position to an extended position in response to detecting a triggering event. The retracted and extended positions are relative to the (top side of the) vehicle. For example, the power contactors in the extended position are located higher above the top side (e.g., and above the route) than the same power contactors in the retracted position. In the extended position, the vehicle contactors are poised for conductive coupling to the supply conductors of the off-board system.

One triggering event may be detecting that the vehicle is proximate to the off-board power supply system. For example, the one or more sensors onboard the vehicle may include a proximity sensor, a distance sensor, an audio sensor, or the like. The sensor may generate sensor signals that indicate a proximity of the vehicle (or at least the vehicle contactors) to the off-board system. Once the vehicle contactors are determined to be within a threshold proximity of the off-board system, the controller may control the actuator(s) to raise the vehicle contactors to the extended position. A second triggering event may be detecting that the control contactor is electrically connected with the corresponding control conductor of the off-board power supply system. For example, when the vehicle power supply system is not in use (e.g., not transferring electrical power with the off-board system), the control contactor(s) may remain in an extended position while the power contactors occupy a retracted position. With the control contactor(s) extended, the control contactor(s) may conductively couple to the control conductors as the vehicle arrives at the off-board system. After confirming that the control contactor(s) is conductively coupled to the off-board system, the onboard controller may control the actuator(s) to lift the power contactors to the extended position, such that the power contacts move upward into contact with the corresponding off-board power conductors.

Figure 3:
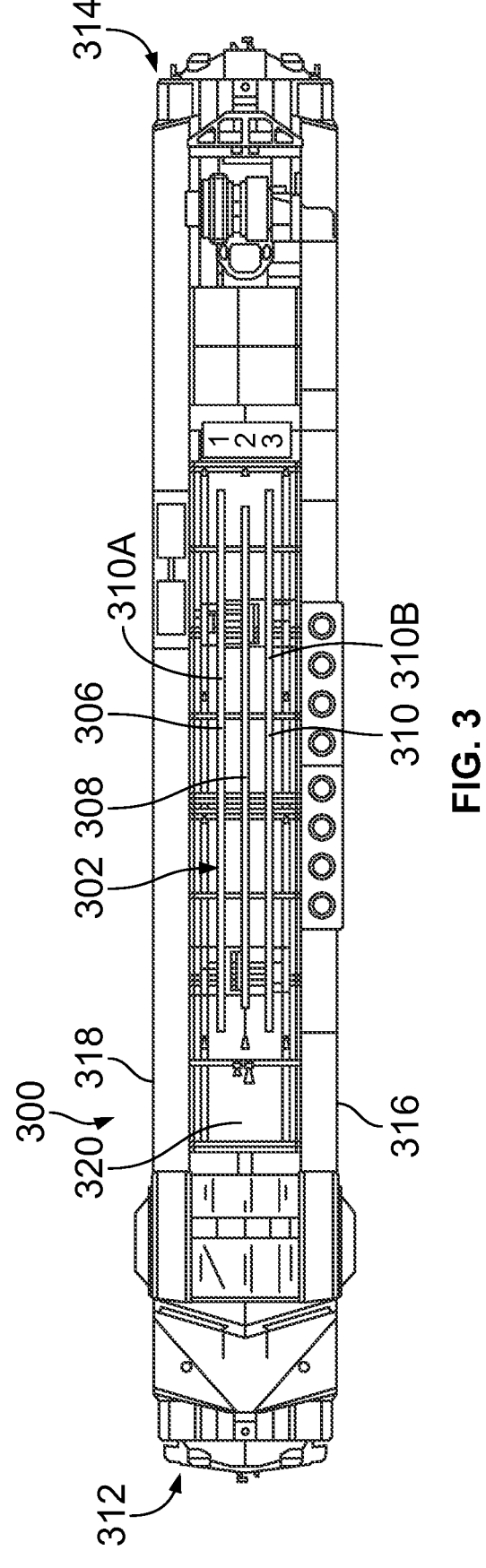
FIG. 3 is a top-down plan view of a vehicle that includes a vehicle power supply system of the power transfer system according to an embodiment.

FIG. 3 is a top-down plan view of a vehicle 300 that includes a vehicle power supply system 302 according to an embodiment. The vehicle power supply system in FIG. 3 may represent the vehicle power supply system shown in FIG. 2 and/or may be part of the power transfer system shown in FIG. 1. Only the vehicle electrical contactors 306 of the vehicle power supply system are visible in FIG. 3.

The vehicle has a front end 312 and a back end 314 opposite the front end. The vehicle has a first side 316 and a second side 318 that extend from the back end to the front end. The second side is opposite the first side. The vehicle has a top side 320 that is between the first side and the second side and extends from the back end to the front end. The vehicle power supply system includes the vehicle electrical contactors extending along the top side of the vehicle. The vehicle electrical contactors (referred to herein as vehicle contactors) may be the vehicle contactors shown in FIG. 2. The vehicle contactors in the illustrated embodiment are electrically conductive rails. The rails are exposed along the top side of the vehicle to physically contact conductors of an off-board power supply system (e.g., the supply conductors shown in FIG. 2). The vehicle contactors are laterally spaced apart from each other at different locations between the first and second sides of the vehicle. The vehicle contactors may be parallel to one another. The vehicle contactors may be parallel to a longitudinal or length axis of the vehicle.

In the illustrated embodiment, the vehicle power supply system has three vehicle contactors labeled "1", "2", and "3". The three contactors include a control contactor 308 (e.g., contactor 2 in FIG. 3) and two power contactors 310. The power contactors include a first power contactor 310A (e.g., contactor 1) and a second power contactor 310B (e.g., contactor 3). The first and second power contactors may receive different polarities of electrical power from an off-board power supply system to power the vehicle. The control contactor may conduct a control signal indicative of whether the first and second power contactors are conductively coupled with the off-board power supply system. In the illustrated embodiment, the control contactor has a medial position between the first and second power contactors.

In a working example, the vehicle contactors may be relatively long which increases the positional tolerance of the vehicle relative to the off-board power supply system. For example, the vehicle contactors may extend lengths that are at least 20% of a total length of the vehicle from the front end to the back end. Optionally, the vehicle contactors may extend lengths that are at least 25%, at least 30%, at least 33.3% (e.g., one-third), or at least 35% of the vehicle length. The extension length may be selected with reference to application specific parameters. In the illustrated embodiment, the vehicle is a locomotive that is about 15 meters long, and is part of a train that is about 75 meters long. The vehicle contactors may be about 3 meters in length. In another embodiment, the contactors are about 10 meters long and run about the entire length of the locomotive. Optionally, each of the vehicle contactors may be defined by multiple sections that are electrically and mechanically coupled together, rather than having monolithic contactors that extend long lengths. Segmenting the contactors may ease maintenance tasks by enabling the selective removal of one section relative to another section to access a desired area of the vehicle. The segmented contactors may enable the contactors to flex at the joints, to reduce strain on the contactor material. Segmentation may allow for relatively easier maintenance and replacement.

The length of the vehicle contactors may define the length of the stopping window within which the vehicle can stop to enable the vehicle contactors to align with and conductively couple to the off-board conductors. For example, the vehicle (e.g., locomotive) must stop at a location such that the conductors of the off-board power supply system are located between the two ends of the vehicle contactors. In the illustrated embodiment, the center control contactor is shorter than the lateral power contactors, and the length of the stopping window is defined (at least partially) by the length of the control contactor. The control contactor may be shorter than the power contactors as failsafe mechanism to avoid a situation in which the control contactor is coupled to the off-board control conductor while at least one of the power contactors is not properly coupled to the corresponding power conductor, due to the angle of the vehicle relative to the off-board system, the longitudinal position of the vehicle relative to the off-board system, and/or the like.

Figures 4A, 4B, 5A, 5B, 6:
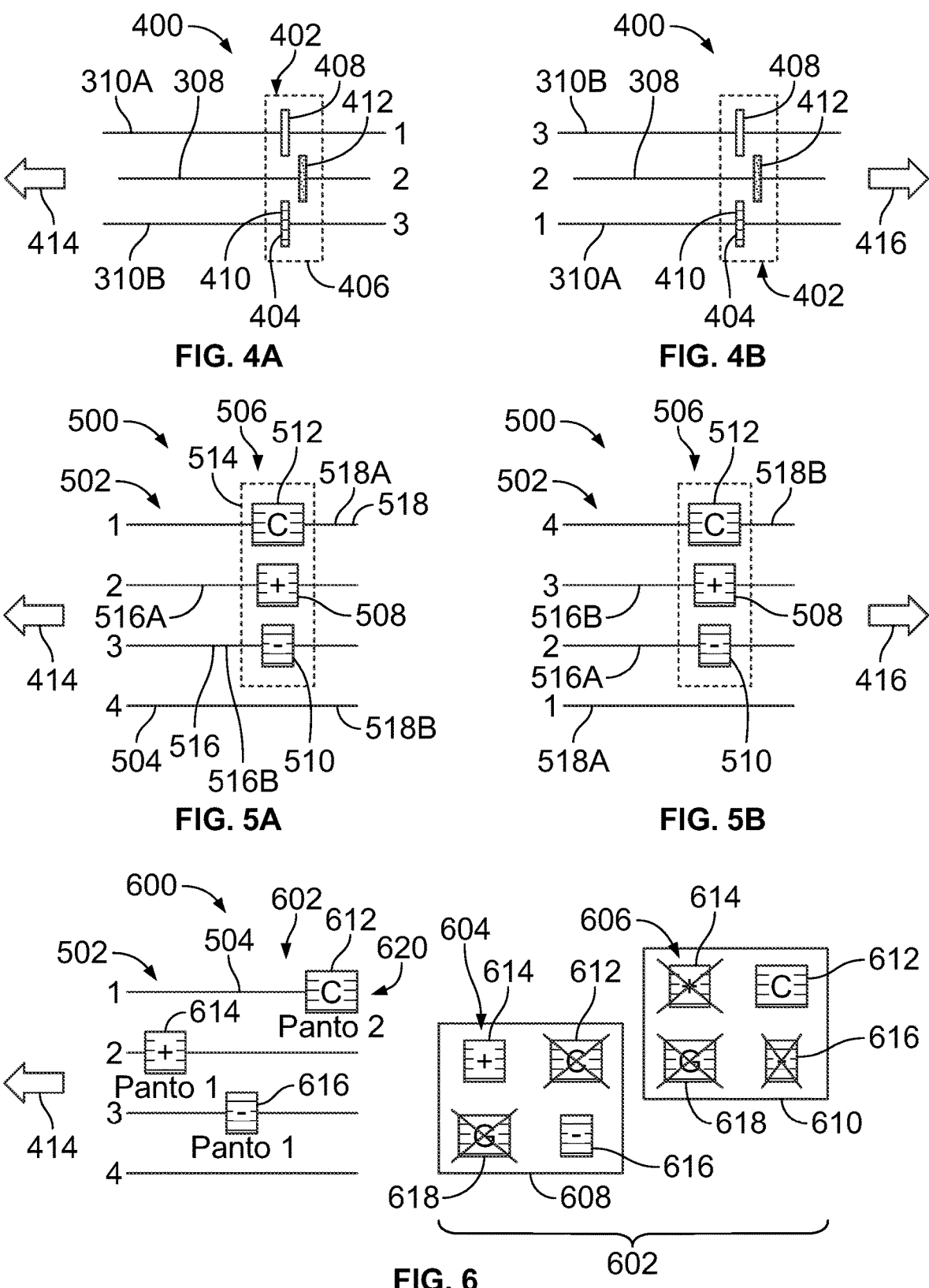
FIG. 4A is a diagram of a power transfer system with a vehicle in a first orientation relative to an off-board power supply system according to an embodiment.
FIG. 4B is a diagram of the power transfer system of FIG. 4A with the vehicle in a second orientation relative to the off-board power supply system.
FIG. 5A is a diagram of a power transfer system with a vehicle in the first orientation relative to an off-board power supply system according to another embodiment.
FIG. 5B is a diagram of the power transfer system of FIG. 5A with the vehicle in the second orientation relative to the off-board power supply system.
FIG. 6 is a diagram of a power transfer system which is a variation of the power transfer system shown in FIGS. 5A and 5B.

FIG. 4A is a diagram of a power transfer system 400 according to an embodiment. The power transfer system includes the vehicle power supply system with the three vehicle electrical contactors shown in FIG. 3. The power transfer system may include an off-board power supply system 402. The off-board power supply system may be the off-board power supply system shown in FIG. 1 and/or FIG. 2. The off-board power supply system (referred to herein as off-board system) includes three supply conductors 404 that are held by a frame 406. The diagram represents a top-down view, similar to the view in FIG. 3, showing the frame and supply conductors overlaid on top of the vehicle contactors.

The supply conductors in an embodiment include a positive conductor 408, a negative conductor 410, and a control conductor 412. For ease of identification, the positive conductor is illustrated as having no shading or interior lines; the negative conductor has stripes; and the control conductor is shaded. The supply conductors are elongated and extend transverse to the vehicle contactors. For example, the supply conductors may be approximately perpendicular (e.g., within +/−10 degrees of 90 degrees) to the vehicle contactors. The supply conductors are spaced apart for conductively coupling to different corresponding vehicle contactors, without conductively coupling to each other (e.g., electrical shorting). The elongate lengths of the supply conductors may be between 1 and 4 feet, which provides some lateral positional tolerance for the vehicle relative to the off-board system. Although lateral tolerance is not a concern for rail-based vehicles like the locomotive shown in FIG. 3, lateral tolerance can be an issue for buses and other non-rail vehicles. Staggering the conductors such that the middle control conductor is off-set relative to the positive and negative conductors allows the conductors to have relatively long lateral lengths to provide generous lateral positional tolerance without risk of electrical shorting. The lateral positional tolerance may be approximately equal to the shortest conductor length, such that the tolerance may be between 1 and 4 feet.

The diagram of FIG. 4A shows a first coupling configuration that occurs while the vehicle has a first orientation relative to the off-board system. In the first orientation, the vehicle faces in a first forward-facing direction, which is the direction that the locomotive in FIG. 3 is facing. In this first coupling configuration, the first power contactor (e.g., contactor 1) is positioned to contact the positive conductor of the off-board system; the control contactor (e.g., contactor 2) is positioned to contact the control conductor of the off-board system; and the second power contactor (e.g., contactor 3) is positioned to contact the negative conductor of the off-board system. The contact refers to the conductive coupling that occurs when the conductors are lowered towards the contactors on the vehicle (as shown by the pantograph in FIG. 1) and/or the contactors on the vehicle are raised towards the conductors until contactors physical contact the corresponding conductors. The control contactor couples to the control conductor to convey the control signal that is indicative of whether the power contactors are conductively coupled to the corresponding positive and negative conductors. Once the transfer of electrical power is initiated, the first power contactor receives a positive polarity of the electrical power from the positive conductor. The second power contactor receives a negative polarity of the electrical power from the negative conductor.

FIG. 4B is a diagram of the power transfer system of FIG. 4A with the vehicle in a second orientation relative to the off-board power supply system. The second orientation of the vehicle is opposite the first orientation shown in FIG. 4A. For example, the vehicle faces in a second forward-facing direction 416 that is opposite the first forward-facing direction. If the locomotive in FIG. 3 has the first orientation, the second orientation represents a 180-degree flip of the locomotive from the illustrated orientation, such that the front is now facing towards the right side of the page. The flipped orientation causes the first power contactor (e.g., contactor 1) to now be below the control contactor (e.g., contactor 2) in the illustrated diagram, and the second power contactor (e.g., contactor 3) to be above the control contactor in the diagram. The off-board power supply system is unchanged from FIG. 4A because the off-board power supply system did not change its position.

FIG. 4B shows a second coupling configuration when the vehicle is in the second orientation relative to the off-board system. In the second coupling configuration, the second power contactor is positioned to contact the positive conductor of the off-board system, and the first power contactor is positioned to contact the negative conductor of the off-board system. The control contactor is still positioned to contact the control conductor of the off-board system, such that the control contactor contacts the control conductor in regardless of whether the vehicle is in the first or second orientation. Once the transfer of electrical power is initiated, the second power contactor receives the positive polarity of the electrical power from the positive conductor, and the first power contactor receives the negative polarity of the electrical power from the negative conductor.

The first and second power contactors on the vehicle effectively switch polarity depending on the orientation of the vehicle. In an embodiment, the power electronics of the vehicle power supply system accommodate this switch in polarity. For example, the power electronics may rectify the positive polarity of the electrical power and/or the negative polarity of the electrical power. In an embodiment, the power electronics may rectify the positive polarity and the negative polarity while the vehicle has the second orientation, but not while the vehicle has the first orientation. For example, the first power contactor may be planned as a positive polarity contactor, so the power electronics do not switch the polarity when the first power contactor receives the positive polarity in the first orientation, but the power electronics do switch the polarity when the first power contactor receives the negative polarity in the second orientation.

The vehicle electrical contactors lack a ground contactor in the illustrated embodiment. A ground circuit may be provided by the contact between the wheels of the locomotive and the rail or a dedicated grounding connection that is separate from the contactors.

Optionally, the off-board system may include a second positive conductor and a second negative conductor to increase the rate (e.g., current) of power transfer to the vehicle. For example, the second positive conductor may be next to the existing positive conductor such that both positive conductors conductively couple to the same power contactor (either the first or the second power contactor depending on the vehicle orientation). The second negative conductor may be next to the existing negative conductor such that both negative conductors couple to the same power contactor.

FIG. 5A is a diagram of a power transfer system 500 according to another embodiment. The power transfer system includes a vehicle power supply system 502 with the four vehicle electrical contactors 504. The vehicle power supply system may be similar to the vehicle power supply system shown in FIGS. 3, 4A, and 4B, except for the addition of an additional contactor and a different arrangement of the contactors, as described below. The power transfer system may include an off-board power supply system 506 that has a positive conductor 508, a negative conductor 510, and a control conductor 512 held by a frame 514. The off-board system may be similar to the off-board system shown in FIGS. 4A and 4B except for the positioning of the conductors. For identification purposes, the conductors of the off-board system are labeled "c" for control, "+" for positive, and "−" for negative. Although the conductors are illustrated as boxes, the conductors may have the thin, elongated shapes of the conductors shown in FIGS. 3, 4A, and 4B. FIG. 5A shows the coupling configuration that occurs while the vehicle has the first orientation relative to the off-board system, such that the vehicle faces the first forward-facing direction 414.

In the illustrated embodiment, the vehicle electrical contactors include two power contactors 516 and two control contactors 518. The contactors are labeled "1" through "4". In an embodiment, the two power contactors are between the two control contactors. For example, a first control contactor 518A is contactor 1; a first power contactor 516A is contactor 2; a second power contactor 516B is contactor 3; and a second control contactor 518B is contactor 4.

While the vehicle has the first orientation relative to the off-board system, the first control contactor (e.g., contactor 1) is positioned to align with and contact the control conductor of the off-board system. The first power contactor (e.g., contactor 2) is positioned to align with and contact the positive conductor, and the second power contactor (e.g., contactor 3) is positioned to align with and contact the negative conductor. As such, the first control contactor conducts the control signal, the first power contactor receives the positive polarity of the electrical power, and the second power contactor receives the negative polarity of the electrical power. The second control contactor (e.g., contactor 4) does not contact or conductively couple to any of the conductors of the off-board system in the first orientation.

FIG. 5B is a diagram of the power transfer system of FIG. 5A with the vehicle in the second orientation relative to the off-board power supply system. While the vehicle is oriented in the second forward-facing direction 416, the order of the contactors is flipped relative to the conductors of the off-board system, which are unchanged. In this second coupling configuration, the second control contactor (e.g., contactor 4) aligns with and contacts the control conductor, the second power contactor (e.g., contactor 3) aligns with and contacts the positive conductor, and the first power contactor (e.g., contactor 2) aligns with and contacts the negative conductor. The first control contactor (e.g., contactor 1) does not contact or conductively couple to any of the conductors in the second orientation.

The illustrated embodiment is similar to the embodiment shown in FIGS. 4A and 4B in that the power contactors receive different polarities of the electrical power depending on the orientation of the vehicle. As described above, the power electronics may rectify the positive polarity and/or the negative polarity of the electrical power to switch the polarity in at least one of the orientations. In an embodiment, the first and second control contactors are electrically connected to each other, such that the control contactors effectively function as single contactor. As such, the control circuit may function the same regardless of whether the first control contactor or the second control contactor conductively couples to the control conductor of the off-board system.

FIG. 6 is a diagram of a power transfer system 600 which is a variation of the power transfer system shown in FIGS. 5A and 5B. For example, the power transfer system in FIG. 6 includes the same vehicle power supply system as the embodiment in FIGS. 5A and 5B with the four vehicle electrical contactors. The power transfer system has a different off-board power supply system 602 than the earlier embodiment. The off-board system includes a first conductor set 604 and a second conductor set 606. The first conductor set may be components of a first pantograph 608 of the off-board system, and the second conductor set may be components of a second pantograph 610 of the off-board system. The two pantographs may be copies or replicas of each other. Each of the first and second conductor sets has a control conductor 612, a positive conductor 614, a negative conductor 616, and a ground conductor 618 arranged in a two-by-two grid or array. The second conductor set is offset from the first conductor set.

In the illustrated embodiment, several of the conductors in the first and second conductor sets are disabled, either via removal or disconnection, such that those conductors do not conduct electrical signals or power. The disabled conductors are shown in FIG. 6 by "X" marks. In the first conductor set, the control and ground conductors are disabled. In the second conductor set, the positive, ground, and negative conductors are disabled. The net result of disabling the conductors and positioning the two conductor sets with the offset is an active set 620 of three conductors shown overlaid on the vehicle contactors. The active set of conductors is constructively the same as the conductors shown in FIGS. 5A and 5B. The embodiment of FIG. 6 achieves similar functionality as the embodiment of FIGS. 5A and 5B using two existing pantographs, without requiring a redesign.

Figures 7A, 7B, 8, 9:
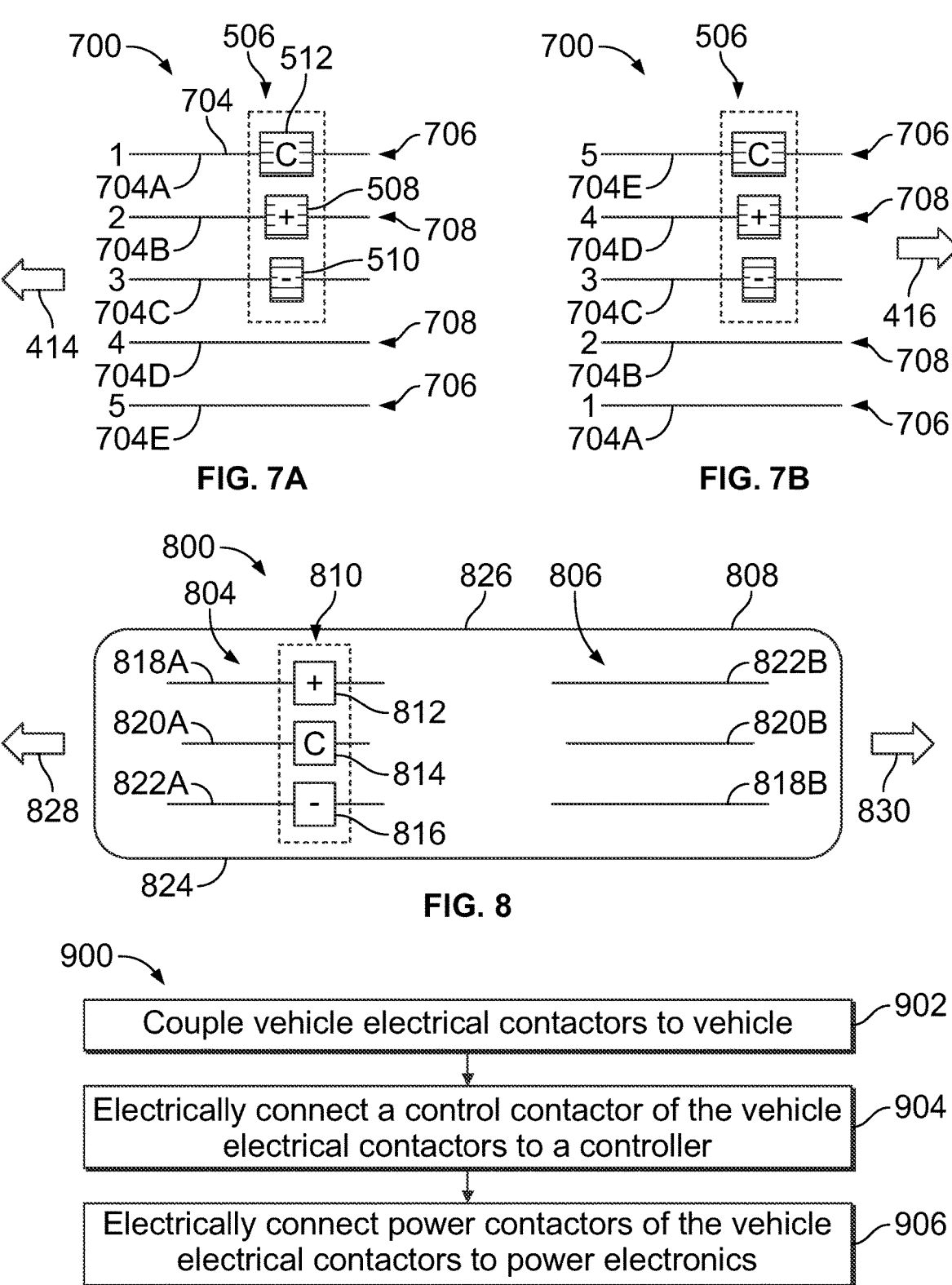
FIG. 7A is a diagram of a power transfer system with a vehicle in the first orientation relative to an off-board power supply system according to another embodiment.
FIG. 7B is a diagram of the power transfer system of FIG. 7A with the vehicle in the second orientation relative to the off-board power supply system.
FIG. 8 illustrates a power transfer system according to another embodiment.
FIG. 9 is a flow chart of a method of forming a vehicle power supply system according to an embodiment.

FIG. 7A is a diagram of a power transfer system 700 according to another embodiment. The power transfer system includes the same off-board power supply system shown in FIGS. 5A and 5B. The power transfer system includes a vehicle power supply system 702 with five vehicle electrical contactors 704. The contactors include a first contactor 704A, a second contactor 704B, a third contactor 704C, a fourth contactor 704D, and fifth contactor 704E. The contactors extend parallel to one another and are laterally spaced in the numerical order such that the third contactor is a medial or middle contactor. The first contactor (e.g., "1" in FIGS. 7A and 7B) and the fifth contactor ("5") define a first pair 706 of contactors. The first and fifth contactors may be electrically connected to each other to effectively function as single contactor. The second contactor ("2") and the fourth contactor ("4") define a second pair 708 of contactors. The second and fourth contactors may be electrically connected to each other to effectively function as single contactor. The second pair is electrically separate from (e.g., not electrically connected to) the first pair. The second pair is disposed between the first pair (e.g., between the first and fifth contactors). The third or medial contactor ("3") is disposed between the second pair of contactors (e.g., between the second and fourth contactors).

The illustrated embodiment of the power transfer system does not require any polarity switching. For example, no contactors receive the positive polarity of the electrical power in the first vehicle orientation, and the negative polarity of the electrical power in the second vehicle orientation. This is accomplished by designating different functions for each of the first pair of contactors, the second pair of contactors, and the medial contactor. For example, one of the first pair, the second pair, or the medial contactor functions as a positive contactor to receive the positive polarity of the electrical power in each of the first and second orientations of the vehicle relative to the off-board system. Another of the first pair, the second pair, or the medial contactor functions as a negative contactor to receive the negative polarity of the electrical power in each of the first and second vehicle orientations. The last of the first pair, the second pair, or the medial contactor defines the control contactor. The control contactor conductively couples to the control conductor of the off-board system to conduct the control signal indicative of whether the positive and negative contactors are properly coupled to the corresponding conductors.

In the illustrated embodiment, the first pair of contactors defines the control contactor, the second pair of contactors defines the positive contactor, and the medial contactor defines the negative contactor. For example, as shown in FIG. 7A, while the vehicle is in the first orientation with the first forward-facing direction, a first contactor of the first pair (e.g., contactor 1) aligns with and conductively couples to the control conductor of the off-board system. A first contactor of the second pair (e.g., contactor 2) aligns with and conductively couples to the positive conductor of the off-board system. The medial contactor aligns with and conductively couples to the negative conductor of the off-board system.

FIG. 7B is a diagram of the power transfer system of FIG. 7A with the vehicle in the second orientation relative to the off-board power supply system. While the vehicle is oriented in the second forward-facing direction, the order of the contactors is flipped relative to the conductors of the off-board system, which are unchanged. In this second coupling configuration, the second contactor of the first pair (e.g., contactor 5) aligns with and conductively couples to the control conductor of the off-board system. The second contactor of the second pair (e.g., contactor 4) aligns with and conductively couples to the positive conductor of the off-board system. The medial contactor still aligns with and conductively couples to the negative conductor of the off-board system. Because the first and fifth contactors are electrically connected and the second and fourth contactors are electrically connected, the different orientations do not affect the conduction pathways. The power electronics may not need to switch the polarities of the electrical power in either of the orientations. Optionally, the power electronics of the vehicle power supply system may omit one or more components that would be used to switch polarities, such as a rectifier.

The illustrated embodiment shows one of six potential functional arrangements of the five-contactor system. For example, any of the first pair, the second pair, and the medial contactor can be used as the positive contactor, the negative contactor, or the control contactor. In a second functional arrangement, the medial contactor may function as the control contactor, such that the medial contactor aligns with and couples to the control conductor of the off-board system. The first pair may function as the positive contactor, and the second pair may function as the negative contactor.

FIG. 8 illustrates a power transfer system 800 according to another embodiment. The power transfer system includes a vehicle power supply system 802 that has a first contactor set 804 and a second contactor set 806 extending along a top side 806 of a vehicle 808. The first contactor set is spaced apart from the second contactor set along a length of the vehicle between a front end and a back end of the vehicle. The power transfer system include an off-board power supply system 810 which includes a positive conductor 812, a negative conductor 814, and a control conductor 816.

The first contactor set includes a first positive contactor 818A, a first control contactor 820A, and a first negative contactor 822A. The second contactor set includes a second positive contactor 818B, a second control contactor 820B, and a second negative contactor 822B. The first contactor set of the vehicle power supply system has a reverse arrangement relative to the second contactor set. For example, the first negative contactor is the closest contactor of the first contactor set to a first side 824 of the vehicle, and the second negative contactor is the closest contactor of the second contactor set to a second side 826 of the vehicle, opposite the first side. The control contactor of each of the sets is in the middle.

When the vehicle has a first orientation relative to the off-board system the vehicle faces a first direction 828. In the first orientation, the vehicle operator positions the vehicle such that the first contactor set aligns with the conductors of the off-board system to conductively couple to the corresponding conductors. For example, the first positive contactor couples to the positive conductor, the first negative contactor couples to the negative conductor, and the first control contactor couples to the control conductor. The power transfer operation is similar to the embodiments described above, such as in FIGS. 4A and 4B. In the first orientation, the second contactor set does not conduct electrical power from the off-board system. For example, the second contactor set may be physically separated from the conductors of the off-board system, as shown in FIG. 8. Alternatively, both contactor sets may be conductively coupled to the conductors of the off-board system in both orientations, but the second contactor set is selectively electrically disconnected to block the conduction of electrical power through the second contactor set. The controller of the vehicle power supply system may actuate one or more switch devices to control the conductive states of the first and second contactor sets.

When the vehicle has a second orientation relative to the off-board system the vehicle faces a second direction 830 that is opposite the first direction. In the second orientation, the vehicle operator positions the vehicle such that the second contactor set aligns with the conductors of the off-board system to conductively couple to the corresponding conductors. For example, the second positive contactor couples to the positive conductor, the second negative contactor couples to the negative conductor, and the second control contactor couples to the control conductor. In the second orientation, the first contactor set does not conduct electrical power from the off-board system. As described above, the first contactor set may be physically separated from the conductors or electrically disconnected to block conduction.

Optionally, the first contactor set includes a first ground contactor, and the second contactor set includes a second ground contactor. The contactor sets may be arranged in a two-by-two grid or array. The conductors of the off-board system may include a ground conductor. The conductors may be arranged in a two-by-two grid. In the first orientation, the first ground contactor is positioned to conductively couple to the ground conductor to provide a ground path. In the second orientation, the second ground contactor is positioned to conductively couple to the ground conductor to provide the ground path.

FIG. 9 is a flow chart of a method 900 of forming a vehicle power supply system according to an embodiment. The method optionally may include more steps than shown, fewer steps than shown, and/or different steps than shown in FIG. 9. At step 902, plural vehicle electrical contactors are coupled to a vehicle such that the contactors extend along a top side of the vehicle. The vehicle can be a rail vehicle, a bus, or another type of vehicle. The vehicle contactors may be elongated rails that are electrically conductive and exposed for contacting corresponding conductors of an off-board power supply system. The contactors may be positioned such that the contactors extend parallel to one another. Optionally, the contactors may extend parallel to a longitudinal axis of the vehicle extending from a front end to a back end of the vehicle. In an embodiment, the contactors may include a control contactor and at least first and second power contactors. The contactors are arranged to enable the vehicle power supply system to successfully and safely receive electrical power from the off-board system in each of two opposite orientations of the vehicle relative to the off-board system.

At step 904, the control contactor is electrically connected to a controller of the vehicle power supply system. The controller may generate and/or receive a control signal that is used by the controller (or a controller on the off-board system) to determine whether the conditions are appropriate to initiate electrical power transfer from the off-board system to the vehicle power supply system to power the vehicle.

At step 906, the first and second power contactors are electrically connected to power electronics of the vehicle power supply system. The power electronics may be electrically connected between the power contactors and an energy storage device onboard the vehicle. When the electrical power transfer is initiated, the power electronics may receive positive and negative polarities of electrical power from the first and second contactors, respectively, and may convey the electrical power to the energy storage device to charge the energy storage device. Optionally, the power electronics may be controlled to convey at least some of the received electrical power to one or more motors of the vehicle to power propulsion of the vehicle, without storing the electrical power in the energy storage device. The power electronics may include a rectifier to convert or switch the polarities of the received electrical power, depending on the orientation of the vehicle relative to the off-board system.

In one or more embodiments described herein, the vehicle electrical contactors may receive the polarities of the electrical power for powering the vehicle while the vehicle is one or more of moving or stationary. For example, embodiments described above are designed for the vehicle to stop at the off-board power supply system for a period of time to charge the onboard energy storage device. In other embodiments, the off-board power supply system may transfer power to the vehicle as the vehicle moves. For example, the shapes of the vehicle contactors and the off-board conductors may be essentially switched from the embodiment shown in FIGS. 4A and 4B such that the off-board conductors are elongated rails that extend along the direction of travel of the vehicle. The vehicle contactors may be relatively shorter elongated bars or contact shoes that conductively couple to the off-board conductors and remain coupled over at least a distance of travel of the vehicle along the route.

Optionally, in the embodiments that include a control contactor disposed between power contactors, the control contactor may function as an insulator layer to prohibit electrical shorting between the power contactors of different polarity. For example, the control contactor may prohibit water-created short circuits when the contactors are exposed to rain and other precipitation. Optionally, one or more deformable elements may be provided on or proximate to the vehicle contactors. The deformable elements may be positioned to physically contact the pantograph of the off-board system prior to the conductors contacting the contactors, to soften the impact forces exerted on the contactors. Optionally, the ends of one or more of the contactors may be tapered and/or curved such that the ends of the contactors are lower than the middle segments of the contactors. The contactors may be positioned such that only the middle segments make contact with the conductors of the off-board system (e.g., pantograph), to reduce the risk of damage to the ends of the contactors.

The controller of the vehicle power supply system and the controller of the off-board power supply system are described herein primarily with respect to the control signals (e.g., control pilot) for assuring that the conditions are proper before initiating electrical power transfer. The controllers may communicate information and/or data with each other using the coupling between the control contactor and the control conductor. For example, the controller on the vehicle may generate a signal that identifies that vehicle, which the controller on the off-board system can use for vehicle tracking, billing purposes, or the like. The controller on the vehicle may provide any power transfer settings or constraints to the controller, such as a maximum current that the vehicle power supply system can accept, how much electrical power is desired, and the like.

Optionally, the power transfer system described herein can be used to transfer electrical power from the vehicle power supply system to the off-board power supply system. Optionally, the power transfer system may include a physical lock out cutoff switch, a spark arrestor, and/or a short shunter. The power transfer system optionally may include a camera or other visual-based sensor that is used for determining when the contactors of the vehicle are properly coupled to the corresponding conductors of the off-board system. The electrical power that is transferred may be direct current in various embodiments, although the power electronics of the vehicle power supply system may be able to accept electrical power that is received with variable current and/or voltage.

In one or more embodiments, a vehicle power supply system is provided that includes plural vehicle electrical contactors extending along a top side of a vehicle. The plural vehicle electrical contactors include a control contactor and at least first and second power contactors. The first and second power contactors may receive different polarities of electrical power from an off-board power supply system to power the vehicle. The control contactor may conduct a control signal indicative of whether the first and second power contactors are conductively coupled with the off-board power supply system. The first power contactor may receive a positive polarity of the polarities of the electrical power and the second power contactor may receive a negative polarity of the polarities of the electrical power while the vehicle has a first orientation relative to the off-board power supply system. The first power contactor may receive the negative polarity of the polarities of the electrical power and the second power contactor may receive the positive polarity of the polarities of the electrical power while the vehicle has a second orientation relative to the off-board power supply system. The second orientation is opposite the first orientation.

Optionally, the control contactor is between the first and second power contactors. Optionally, the vehicle electrical contactors extend parallel to one another.

Optionally, the control contactor is a first control contactor, and the vehicle electrical contactors include at least a second control contactor. The first control contactor may conduct the control signal while the vehicle has the first orientation relative to the off-board power supply system, and the second control contactor may conduct the control signal while the vehicle has the second orientation relative to the off-board power supply system. The first and second power contactors may be between the first and second control contactors.

Optionally, the vehicle power supply system further includes power electronics that convey the electrical power received from the first and second power contactors to an energy storage device onboard the vehicle for charging the energy storage device. The power electronics may rectify one or both of the positive polarity of the electrical power or the negative polarity of the electrical power.

Optionally, the vehicle electrical contactors may receive the polarities of the electrical power for charging an energy storage device disposed onboard the vehicle while the vehicle is one or more of moving or stationary. The vehicle electrical contactors may receive the polarities of the electrical power for powering the vehicle to move while vehicle is moving. Optionally, the vehicle power supply system further includes a controller and one or more actuators. The controller is operably connected to the control contactor and the one or more actuators and may control the one or more actuators to move the first and second power contactors from a retracted position to an extended position relative to the vehicle in response to detecting that one or more of the vehicle is proximate to the off-board power supply system or the control contactor is electrically connected with a corresponding control conductor of the off-board power supply system. Optionally, each of the vehicle electrical contactors has a length that is at least 25% of a length of the vehicle between a front end of the vehicle and a back end of the vehicle.

In one or more embodiments, a vehicle power supply system is provided that includes a first contactor set and a second contactor set. The first contactor set may be coupled with a top side of a vehicle. The first contactor set includes a first positive contactor, a first negative contactor, and a first control contactor. The second contactor set may be coupled with the top side of the vehicle, and includes a second positive contactor, a second negative contactor, and a second control contactor. While the vehicle has a first orientation relative to an off-board power supply system, the first positive contactor is positioned to conductively couple to a positive conductor of the off-board power supply system to receive a positive polarity of electrical power from the off-board power supply system to power the vehicle; the first negative contactor is positioned to conductively couple to a negative conductor of the off-board power supply system to receive a negative polarity of the electrical power to power the vehicle; and the first control contactor is positioned to conductively couple to a control conductor of the off-board power supply system. While the vehicle has a second orientation relative to the off-board power supply system, opposite to the first orientation, the second positive contactor is positioned to conductively couple to the positive conductor of the off-board power supply system to receive the positive polarity of the electrical power to power the vehicle; the second negative contactor is positioned to conductively couple to the negative conductor of the off-board power supply system to receive the negative polarity of the electrical power to power the vehicle; and the second control contactor is positioned to conductively couple to the control conductor of the off-board power supply system.

Optionally, the first control contactor may conduct a first control signal indicative of whether the first positive contactor and the first negative contactor are conductively coupled with the off-board power supply system while the vehicle has the first orientation. The second control contactor may conduct a second control signal indicative of whether the second positive contactor and the second negative contactor are conductively coupled with the off-board power supply system while the vehicle has the second orientation.

Optionally, the second contactor set may not conduct the electrical power from the off-board power supply system while the vehicle has the first orientation relative to the off-board power supply system, and the first contactor set may not conduct the electrical power from the off-board power supply system while the vehicle has the second orientation relative to the off-board power supply system. Optionally, the first contactor set is spaced apart from the second contactor set along a length of the vehicle between a front end of the vehicle and a back end of the vehicle. Optionally, the vehicle power supply system further includes power electronics that convey the electrical power received from the first and second contactor sets to an energy storage device onboard the vehicle for charging the energy storage device. Optionally, the first contactor set includes a first ground contactor and the second contactor set includes a second ground contactor. The first ground contactor may be positioned to conductively couple to a ground conductor of the off-board power supply system while the vehicle has the first orientation relative to the off-board power supply system, and the second ground contactor may be positioned to conductively couple to the ground conductor of the off-board power supply system while the vehicle has the second orientation relative to the off-board power supply system.

In one or more embodiments, a vehicle power supply system is provided that includes plural vehicle electrical contactors extending along a top side of a vehicle. The plural vehicle electrical contactors include a first pair of contactors, a second pair of contactors between the first pair of contactors, and a medial contactor between the second pair of contactors. While the vehicle has a first orientation relative to an off-board power supply system, one of a first contactor of the first pair, a first contactor of the second pair, or the medial contactor is positioned to conductively couple to a positive conductor of the off-board power supply system to receive a positive polarity of electrical power from the off-board power supply system to power the vehicle; another of the first contactor of the first pair, the first contactor of the second pair, or the medial contactor is positioned to conductively couple to a negative conductor of the off-board power supply system to receive a negative polarity of the electrical power from the off-board power supply system to power the vehicle; and the third of the first contactor of the first pair, the first contactor of the second pair, or the medial contactor is positioned to conductively couple to a control conductor of the off-board power supply system. While the vehicle has a second orientation relative to the off-board power supply system, which is opposite the first orientation, one of a second contactor of the first pair, a second contactor of the second pair, or the medial contactor is positioned to conductively couple to the positive conductor of the off-board power supply system to receive the positive polarity of the electrical power to power the vehicle; another of the second contactor of the first pair, the second contactor of the second pair, or the medial contactor is positioned to conductively couple to the negative conductor of the off-board power supply system to receive the negative polarity of the electrical power to power the vehicle; and the third of the second contactor of the first pair, the second contactor of the second pair, or the medial contactor is positioned to conductively couple to the control conductor of the off-board power supply system.

Optionally, the first and second contactors of the first pair are electrically connected to each other. The first and second contactors of the second pair may be electrically connected to each other and electrically separate from the first pair.

Optionally, the vehicle power supply system further includes power electronics electrically connected to the vehicle electrical contactors and convey the electrical power received from the off-board power supply system to an energy storage device onboard the vehicle for charging the energy storage device. Optionally, the vehicle electrical contactors are elongated and extend parallel to one other. In one embodiment, the controllers or systems described herein may have a local data collection system deployed and may use machine learning to enable derivation-based learning outcomes. The controllers may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used making determinations, calculations, comparisons and behavior analytics, and the like.

In one embodiment, the controllers may include a policy engine that may apply one or more policies. These policies may be based at least in part on characteristics of a given item of equipment or environment. With respect to control policies, a neural network can receive input of a number of environmental and task-related parameters. These parameters may include, for example, operational input regarding operating equipment, data from various sensors, location and/or position data, and the like. The neural network can be trained to generate an output based on these inputs, with the output representing an action or sequence of actions that the equipment or system should take to accomplish the goal of the operation. During operation of one embodiment, a determination can occur by processing the inputs through the parameters of the neural network to generate a value at the output node designating that action as the desired action. This action may translate into a signal that causes the vehicle to operate. This may be accomplished via backpropagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:
1. A vehicle power supply system comprising:
plural vehicle electrical contactors extending along a top side of a vehicle, the plural vehicle electrical contactors including a control contactor and at least first and second power contactors, the first and second power contactors configured to receive different polarities of electrical power from an off-board power supply system to power the vehicle, the control contactor configured to conduct a control signal indicative of whether the first and second power contactors are conductively coupled with the off-board power supply system,
the first power contactor configured to receive a positive polarity of the polarities of the electrical power and the second power contactor configured to receive a negative polarity of the polarities of the electrical power while the vehicle has a first orientation relative to the off-board power supply system, the first power contactor configured to receive the negative polarity of the polarities of the electrical power and the second power contactor configured to receive the positive polarity of the polarities of the electrical power while the vehicle has a second orientation relative to the off-board power supply system, the second orientation opposite the first orientation, and power electronics configured to rectify the polarities of the electrical power based on the vehicle being in the second orientation and not rectify the polarities in the first orientation, wherein the power electronics are configured to rectify the negative polarity received at the first power contactor to switch the negative polarity to the positive polarity and wherein the power electronics are configured to rectify the positive polarity received at the second power contactor to switch the positive polarity to the negative polarity.

2. The vehicle power supply system of claim 1, wherein the control contactor is between the first and second power contactors.

3. The vehicle power supply system of claim 1, wherein the vehicle electrical contactors extend parallel to one another.

4. The vehicle power supply system of claim 1, wherein the control contactor is a first control contactor and the vehicle electrical contactors include at least a second control contactor.

5. The vehicle power supply system of claim 4, wherein the first control contactor is configured to conduct the control signal while the vehicle has the first orientation relative to the off-board power supply system, and the second control contactor is configured to conduct the control signal while the vehicle has the second orientation relative to the off-board power supply system.

6. The vehicle power supply system of claim 4, wherein the first and second power contactors are between the first and second control contactors.

7. The vehicle power supply system of claim 1, wherein the power electronics are configured to convey the electrical power received from the first and second power contactors to an energy storage device onboard the vehicle for charging the energy storage device.

8. The vehicle power supply system of claim 1, wherein the vehicle electrical contactors are configured to receive the polarities of the electrical power for charging an energy storage device disposed onboard the vehicle while the vehicle is one or more of moving or stationary, the vehicle electrical contactors configured to receive the polarities of the electrical power for powering the vehicle to move while vehicle is moving.

9. The vehicle power supply system of claim 1, further comprising a controller and one or more actuators, the controller operably connected to the control contactor and the one or more actuators and configured to control the one or more actuators to move the first and second power contactors from a retracted position to an extended position relative to the vehicle in response to detecting that one or more of the vehicle is proximate to the off-board power supply system or the control contactor is electrically connected with a corresponding control conductor of the off-board power supply system.

10. The vehicle power supply system of claim 1, wherein each of the vehicle electrical contactors has a length that is at least 25% of a length of the vehicle between a front end of the vehicle and a back end of the vehicle.

* * * * *